(12) United States Patent
Bosworth et al.

(10) Patent No.: US 10,215,495 B2
(45) Date of Patent: Feb. 26, 2019

(54) METALLURGICAL APPARATUS

(71) Applicant: EMP Technologies Limited, Burton-on-Trent, Staffordshire (GB)

(72) Inventors: Paul Bosworth, Burton-on-Trent (GB); Jason Dennis Midgley, Burton-on-Trent (GB)

(73) Assignee: PYROTEK, INC., Aurora, OH (US)

( * ) Notice: Subject to any disclaimer, the term of this patent is extended or adjusted under 35 U.S.C. 154(b) by 199 days.

(21) Appl. No.: 14/900,095

(22) PCT Filed: Jun. 17, 2014

(86) PCT No.: PCT/GB2014/051859
§ 371 (c)(1),
(2) Date: Dec. 18, 2015

(87) PCT Pub. No.: WO2014/202966
PCT Pub. Date: Dec. 24, 2014

(65) Prior Publication Data
US 2016/0138868 A1 May 19, 2016

(30) Foreign Application Priority Data
Jun. 21, 2013 (GB) .................................. 1311078.8

(51) Int. Cl.
*F27D 27/00* (2010.01)
*F27B 9/16* (2006.01)
(Continued)

(52) U.S. Cl.
CPC .............. *F27D 27/005* (2013.01); *B01F 5/10* (2013.01); *C21C 5/52* (2013.01); *C21C 5/5247* (2013.01);
(Continued)

(58) Field of Classification Search
CPC . B01F 5/10; C21C 5/52; C21C 5/5247; C22B 21/066; C22B 9/02; F27B 9/16;
(Continued)

(56) References Cited

U.S. PATENT DOCUMENTS 4,531,717 A * 7/1985 Hebrant .................... F27D 3/14
266/166
4,615,675 A * 10/1986 Vorel .................... F27B 14/065
264/30
(Continued)

FOREIGN PATENT DOCUMENTS

GB             246106      * 12/2012  ............. B22D 41/02

*Primary Examiner* — Jessee R Roe
*Assistant Examiner* — Michael Aboagye
(74) *Attorney, Agent, or Firm* — Fay Sharpe LLP

(57) ABSTRACT

A metallurgical apparatus comprises a vessel for holding a body of liquid metal and a circulating apparatus for circulating the body of liquid metal within the vessel. The vessel has a peripheral wall and a base, and the circulating apparatus comprises a launder that provides an open-topped flow channel and a pumping device for pumping liquid metal through the launder. The launder has an inlet end connected to a first opening in the peripheral wall and an outlet end connected to a second opening in the peripheral wall. The pumping device is configured to pump liquid metal through the launder so that liquid metal flows out of the vessel through the first opening and into the vessel through the second opening, thereby causing the body of liquid metal within the vessel to circulate.

14 Claims, 13 Drawing Sheets

(51) Int. Cl.
- *C21C 5/52* (2006.01)
- *F27D 3/00* (2006.01)
- *C22B 9/02* (2006.01)
- *C22B 21/06* (2006.01)
- *B01F 5/10* (2006.01)

(52) U.S. Cl.
CPC .............. *C22B 9/02* (2013.01); *C22B 21/066* (2013.01); *F27B 9/16* (2013.01); *F27D 3/00* (2013.01); *F27D 2003/0054* (2013.01); *Y02P 10/234* (2015.11)

(58) Field of Classification Search
CPC .. F27D 2003/0054; F27D 27/005; F27D 3/00; Y02P 10/234
USPC .................. 266/44, 233, 234, 235, 236, 237
See application file for complete search history.

(56) References Cited

U.S. PATENT DOCUMENTS

| | | | | |
|---|---|---|---|---|
| 6,973,955 | B2 * | 12/2005 | Tingey ................... | B22D 35/06 164/133 |
| 7,700,036 | B2 * | 4/2010 | Sipila ..................... | B22D 35/06 266/196 |
| 8,158,055 | B2 * | 4/2012 | Takahashi ............... | B01F 5/102 266/234 |

* cited by examiner

METALLURGICAL APPARATUS

CROSS REFERENCE

This application is a U.S. National Phase of PCT International Application No. PCT/GB2014/051859, filed Jun. 17, 2014 published as WO 2014/202966 on Dec. 24, 2014, which claims priority to United Kingdom Application No. 1311078.8, filed Jun. 21, 2013. The entirety of each of the above-identified applications is hereby incorporated by reference.

BACKGROUND

Field

The present disclosure relates to a metallurgical apparatus and a method of circulating liquid metal within a metallurgical apparatus.

In one preferred embodiment, the disclosure relates to a furnace for melting metals including, but not limited to, non-ferrous metals such as aluminium, magnesium and zinc.

Certain Related Art

Some furnaces for melting metal generally include a circulator device for circulating the melt within the furnace to ensure even heating and distribution of alloys. Various circulator devices are known, including mechanical stirrers and electromagnetic pumping, agitating and stirring devices.

For example, JP 10146650A describes a furnace with an electromagnetic stirring device comprising a disc-shaped permanent magnet located below the floor of the furnace. The magnet can be rotated and the resulting rotating magnetic field causes rotation of the melt in the furnace by electromagnetic induction.

EP 1674814A describes an agitator for agitating a melt, which has a plurality of permanent magnets mounted on a motor-driven rotor. Rotation of the rotor creates a rotating magnetic field, which can be used to pump melt through a passageway that extends between inlet and outlet openings in a wall of the furnace. This causes circulation of the melt in the furnace.

U.S. 2011/0248432A1 describes an electromagnetic pump that has a plurality of permanent magnets mounted on a motor-driven rotor. A spiral passageway extends through a housing that surrounds the rotor and melt can be pumped through this passageway by the rotating magnetic field created by the rotating magnets.

Hertwich Engineering of Braunau in Austria supply a range of electromagnetic pumps and stirrers for circulating and mixing liquid metal. These devices include side channel pumps and stirrers, which use an electromagnetic pump to pump melt through a side channel formed in the wall of a furnace, and a tube pump that uses an electromagnetic pump to pump melt through a tube, for example from one chamber of a furnace to another.

SUMMARY

The above-mentioned circulator devices all include one or more disadvantages. The external electromagnetic stirring device described in JP 10146650A is expensive to implement and the magnetic field produced by the permanent magnets penetrates the liquid metal to only a fixed shallow depth, and does not therefore drive circulation of the metal efficiently. The magnetic rotors described U.S. 2011/0248432A1 and EP 1674814 only act on a limited amount of metal in the melt passageways, producing only a relatively weak flow. The melt passageway also has to be designed so the metal remains in close proximity to the magnetic rotor for as long as possible, which restricts the shape of the passageway to a relatively narrow U shape and so dictates the flow direction of metal as it leaves the passageway. The melt passageways of the systems described U.S. 2011/0248432A1 and EP 1674814, as well as the circulator devices supplied by Hertwich Engineering, cannot easily be cleaned and can become blocked by dross and other materials. Also, where the external passageways are provided, these cannot always be preheated effectively, giving rise to a risk that they could become damaged by thermal shock upon contact with the liquid metal, or they could cause the metal to freeze thereby blocking the passageway.

It is an object of the present disclosure to provide a metallurgical vessel and a method of circulating liquid metal within a metallurgical vessel that mitigates one or more of the aforesaid disadvantages.

According to the one aspect, there is provided a metallurgical apparatus comprising a vessel for holding a body of liquid metal and a circulating apparatus for circulating the body of liquid metal within the vessel, wherein the vessel has a peripheral wall and a base, and the circulating apparatus comprises a launder that provides a flow channel and a pumping device for pumping liquid metal through the launder, wherein the launder has an inlet end connected to a first opening in the peripheral wall and an outlet end connected to a second opening in the peripheral wall, and wherein the pumping device is configured to pump liquid metal through the launder so that liquid metal flows out of the vessel through the first opening and into the vessel through the second opening, thereby causing the body of liquid metal within the vessel to circulate.

The term "launder" as used herein refers to an elongate and substantially horizontal flow channel for liquid metal, which is external to the main body of the vessel and through which the metal can flow to and from the vessel. The flow channel may optionally be open topped (for example, it will typically be U-shaped), and it may optionally include a cover that can be closed to enclose and seal the flow channel. This cover can however be removed or opened to provide access to the flow channel. This allows the flow channel to be cleaned, so that dross and other contaminants can be removed. The disclosure thus provides the advantage of allowing metal to be circulated in the furnace using an external pumping device in an economical and efficient manner, while avoiding the problems associated with the build-up of dross and other contaminates in the flow channel, thus providing high quality metal.

The launder may include a heating system for heating the launder to a desired operating temperature. This helps to protect the launder against being damaged by thermal shock when it comes into contact with the liquid metal, and it ensures that the temperature of the metal does not fall significantly while flowing through the launder, thus avoiding the risk of the metal freezing and blocking the flow channel.

Advantageously, the heating system includes at least one electrical heating element configured to heat the launder. This provides an efficient and reliable mechanism for heating the launder. Advantageously, the launder includes a ceramic trough body that provides the flow channel, and the heating system includes at least one electrical heating element positioned adjacent a side of the ceramic trough body.

Alternatively, other types of heating system may be used, including hot gas systems and combustion-based systems, for example using gas burners to heat the flow channel.

Advantageously, the launder includes a filler layer of a thermally conductive refractory material between the ceramic trough body and the electrical heating element. The filler layer may for example be made of a castable refractory material having a thermal conductivity of at least 3 W/m.K, preferably at least 5 W/m.K and more preferably at least 6.5 W/m.K.

The pumping device preferably includes an electromagnetic pump that generates a moving magnetic field within the flow channel to pump liquid metal along the flow channel. The use of an electromagnetic pump provides for non-turbulent flow of the liquid metal through the launder, and enables the liquid metal to be driven through the launder without coming into contact with any physical pumping devices. Problems of erosion by contact with the metal are thereby avoided. Furthermore, because the launder in uninterrupted cleaning of the flow channel is simplified.

The use of an electromagnetic pump also produces a strong vector type flow, which aids circulation of the liquid metal within the furnace. The launder can be designed to direct this flow to strategic areas of the furnace to ensure greater homogeneity of the metal in the bath. In addition, the mass flow of the liquid metal can be directed towards the position at which scrap metal is introduced into the furnace, thereby benefitting the heat absorption rate of the scrap metal and reducing the melting time. The entry angles of the launder and the internal profile of the launder can be adjusted to maximise this vector effect. The system is not therefore subject to the same design limitations of systems that use permanent magnet rotors.

In one preferred embodiment, the electromagnetic pump comprises a tube pump having a refractory tube and a set of electrical coils arranged around the tube. In another embodiment the electromagnetic pump comprises at least one set of induction elements arranged around a base and one or more sides of the flow channel. In another preferred embodiment the electromagnetic pump comprises a set of U-shaped electrical coils. One advantage of using a set of electrical coils to generate a moving magnetic field within the flow channel is that the depth of penetration of the magnetic field into the liquid metal can be controlled by varying the frequency of the electrical current supplied to the coils, a lower frequency providing a greater depth of penetration. Coupling between the magnetic field and liquid metal can thus be controlled to ensure efficient operation, according to the depth of liquid metal in the flow channel. The ability to increase the depth of penetration by operating at a lower frequency also allows the thickness of the refractory material to be increased for improved safety and reduce risk of leakage.

Alternatively, the pumping device may include a mechanical pump configured to pump liquid metal along the flow channel. The mechanical pump is preferably located within a portion of the launder having an increased cross-sectional width.

Advantageously, the pumping device includes a control device that is configured to control the pumping rate of the pumping device. The control device preferably includes a level measuring device for measuring the level of liquid metal within the launder, and may be configured to control the pumping rate of the pumping device according to a measured level of liquid metal within the launder. The mass flow of the liquid metal can thus be adjusted to achieve optimum thermal efficiency within the main body of the vessel. The level measuring device may alternatively, or in addition, be used as a safety device to halt operation of the pumping device if, for example, the outlet end of the launder becomes blocked, causing the level of melt in the launder to rise.

The metallurgical apparatus may include at least one flow control device that is adjustable between an open configuration in which the flow of liquid metal between the vessel and the launder is permitted, and a closed configuration in which the flow of liquid metal between the vessel and the launder is prevented. The flow control device may for example consist of a dam or sluice gate that can be raised to permit flow, or lowered to prevent or restrict flow. The dam can also be positioned so that the lowest part of the dam is just beneath the surface of the liquid metal, allowing metal to flow under the gate while holding back dross (oxides or other contaminants) floating on the surface of the metal. The positioning of the dams can be automated, for example using level sensing technology, to prevent dross from entering the launder system, and the positions of the dams can be adjusted as the level of metal in the furnace changes.

Optionally the launder may include an additional flow leg for guiding a flow of liquid metal to or from the furnace, so that it can be transferred to other metallurgical vessels.

Optionally the metallurgical apparatus may include means for dispensing metal at a higher level. This may consist for example of a vertical vessel mounted between the inlet and outlet ends of the flow channel, and a flow control means (for example a controllable plug or damper) for controlling the flow of metal from the vessel into the launder. By closing this flow control the metal can be forced up the vertical vessel to an alternative outlet at the upper end of the vessel.

Alternatively, the means for dispensing metal at a higher level may consist of a secondary outlet located at a higher level within the launder. The liquid level within the launder can be raised, allowing the liquid metal to flow out of the launder through the secondary outlet, by closing an outlet opening into the furnace and at the same time continuing to pump metal from the furnace into the launder. Liquid metal can thus be transferred from the furnace to another vessel at a higher level.

According to another aspect, there is provided a method of circulating liquid metal in a metallurgical apparatus according to any one of the preceding statements, comprising pumping liquid metal through the launder so that liquid metal flows out of the vessel through the first opening and into the vessel through the second opening, thereby causing the body of liquid metal within the vessel to circulate.

Advantageously, the method comprises pre-heating the launder to protect the launder against being damaged by thermal shock and to ensure that the temperature of the metal does not fall significantly while flowing through the launder, thus avoiding the risk of the metal freezing and blocking the flow channel.

Advantageously, the method further comprises pumping liquid metal through the launder by generating a moving magnetic field within the flow channel. Advantageously, the moving magnetic field is generated using a tube pump. Alternatively, the method may comprise pumping liquid metal through the launder using a mechanical pump located within the launder.

The method preferably further comprises controlling the pumping rate of the pumping device. Advantageously, the method comprises measuring the level of liquid metal within the launder, and controlling the pumping rate of the pumping device according to a measured level of liquid metal within the launder to maintain the vector effect of the flowing metal.

The method may further comprise operating at least one flow control device to control the flow of liquid metal between the vessel and the launder.

The method may further comprise guiding a flow of liquid metal to or from the furnace through an additional flow leg of the launder.

According to another aspect, there is provided a metallurgical apparatus comprising a vessel for holding a body of liquid metal and a circulating apparatus for circulating the body of liquid metal within the vessel, wherein the vessel has a peripheral wall and a base, and the circulating apparatus comprises a passageway that provides a flow channel and a pumping device for pumping liquid metal through the passageway, wherein the passageway has an inlet end connected to a first opening in the peripheral wall and an outlet end connected to a second opening in the peripheral wall, and wherein the pumping device is configured to pump liquid metal through the passageway so that liquid metal flows out of the vessel through the first opening and into the vessel through the second opening, thereby causing the body of liquid metal within the vessel to circulate.

Optionally, the passageway may include a heating system for heating the passageway to a desired operating temperature.

Optionally, the passageway may include a lid that can be opened or removed to provide access to the passageway.

BRIEF DESCRIPTION OF THE DRAWINGS

Various embodiments will now be described by way of example with reference to the accompanying drawings, wherein.

DETAILED DESCRIPTION OF CERTAIN EMBODIMENTS

Figure 1:
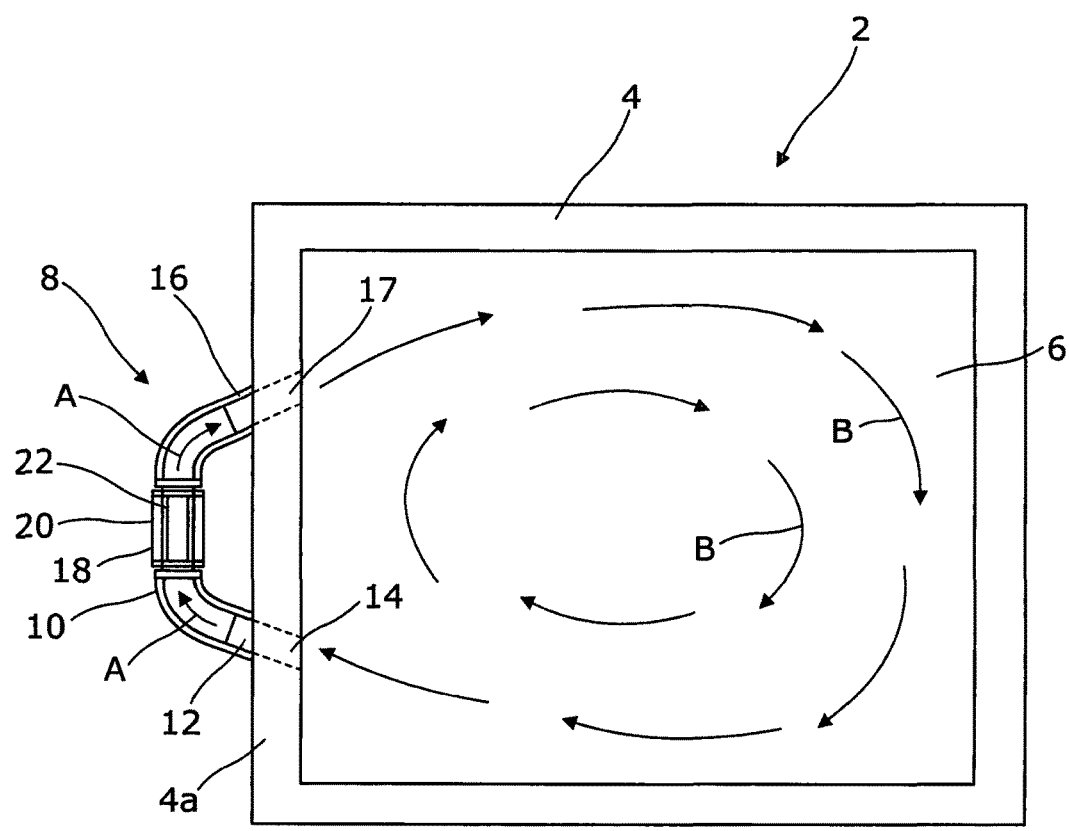
FIG. 1 is a plan view of a furnace having a circulator device.

FIGS. 1-6 depict a metallurgical vessel, in this example a furnace 2, comprising a four-sided peripheral wall 4 and a base 5 that holds a body of liquid metal 6 (or "melt"). In this example, the furnace 2 is made of a suitable refractory material and includes a conventional heater (not shown) for heating and melting metal in the furnace. The furnace 2 may be intended either for melting metal or for holding liquid metal during a refining or casting process. It may be designed for use either with non-ferrous metals such as aluminium, magnesium or zinc, or any other ferrous or non-ferrous metals and metal alloys.

The furnace 2 includes a circulator device 8 for circulating the body of liquid metal 6 in the furnace 2. The circulator device 8 comprises an open-topped trough or a launder 10, which is substantially U-shaped in horizontal section to provide a flow channel 11 for melt to flow through the launder. The launder 10 is externally mounted on a side wall 4a of the furnace 2 and has an inlet end 12 that is connected to an inlet opening 14 in the side wall 4a and an outlet end 16 that is connected to an outlet opening 17 in the side wall 4a, allowing liquid metal to flow to and from the furnace 2 through the launder 10. In this embodiment, the launder 10 is divided into an inlet launder section 10a and an outlet launder section 10b.

The circulator device 8 also includes a pump 18, which is mounted between the inlet and outlet sections 10a, 10b of the launder 10 and is configured to pump melt through the launder 10 from the inlet end 12 to the outlet end 16, as indicated by flow arrows A. Melt therefore flows from the furnace 2 into the launder 10 through the inlet opening 14, and returns to the furnace 2 through the outlet opening 17. This flow of melt through the inlet and outlet openings 14, 17 causes the body of liquid metal 6 in the furnace 4 to circulate as indicated by flow arrows B. Alternatively, by reversing the polarity of the electric current supplied to the pump 18 the melt can be circulated in the opposite direction (in reverse to the directions indicated by the flow arrows A, B).

In this embodiment the pump 18 is an electromagnetic tube pump, which is mounted between the inlet launder section 10a and the outlet launder section 10b. The pump 18 comprises a series of electric coils 20 that are mounted around a refractory tube 22. Each end of the tube 22 is sealed to an opening in an end wall 23 of the respective launder section 10a, 10b. The tube 22 thus interconnects the inlet and outlet launder sections 10a, 10b, allowing melt to flow through the launder 10.

The tube pump 18 generally includes at least three coils 20, and normally six or more coils, which are spaced axially along the length of the tube 22. An alternating current is supplied to each of the coils 20, the phase of the alternating current supplies being shifted so that the coils create a moving magnetic field that travels continuously in one direction along the axis of the tube 22. This moving magnetic field generates eddy currents within the melt in the tube 22 and causes an electromagnetic force that pumps the melt from the inlet end 12 towards the outlet end 16 of the launder 10. This tube pump 18 is conventional (and may for example be of the type sold by Hertwich Engineering) and it will not therefore be described in further detail.

Figure 2:
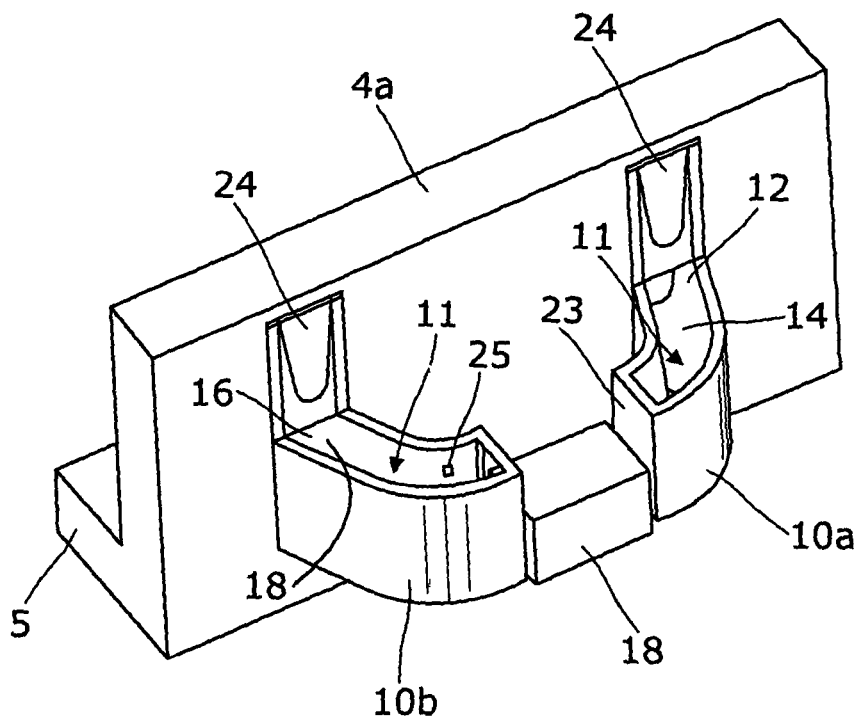
FIG. 2 is an isometric view of the circulator device of FIG. 1, having launder dams.
Figure 3:
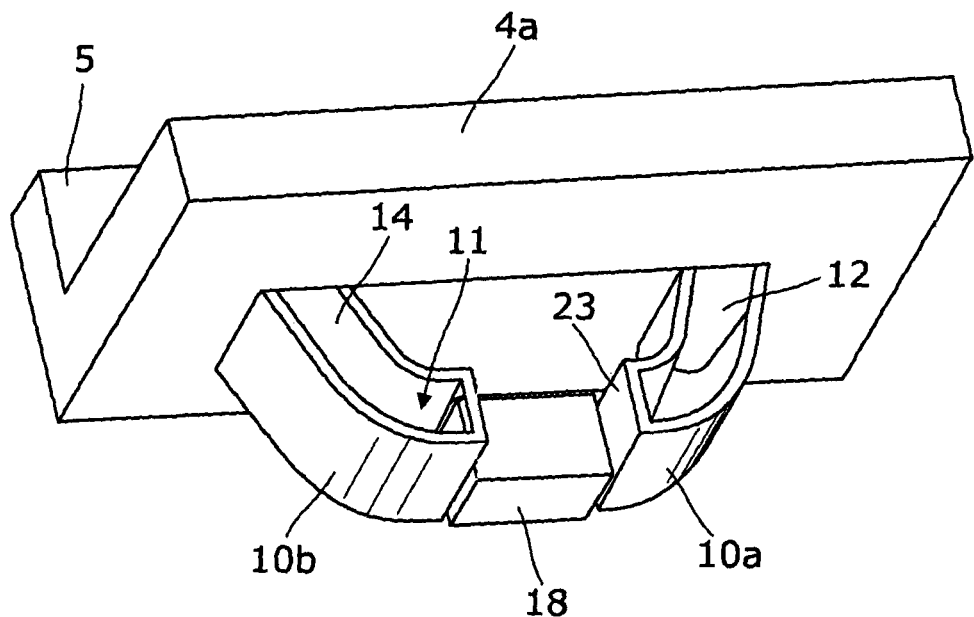
FIG. 3 is another isometric view of the circulator device of FIG. 1, seen from above.
Figure 4:
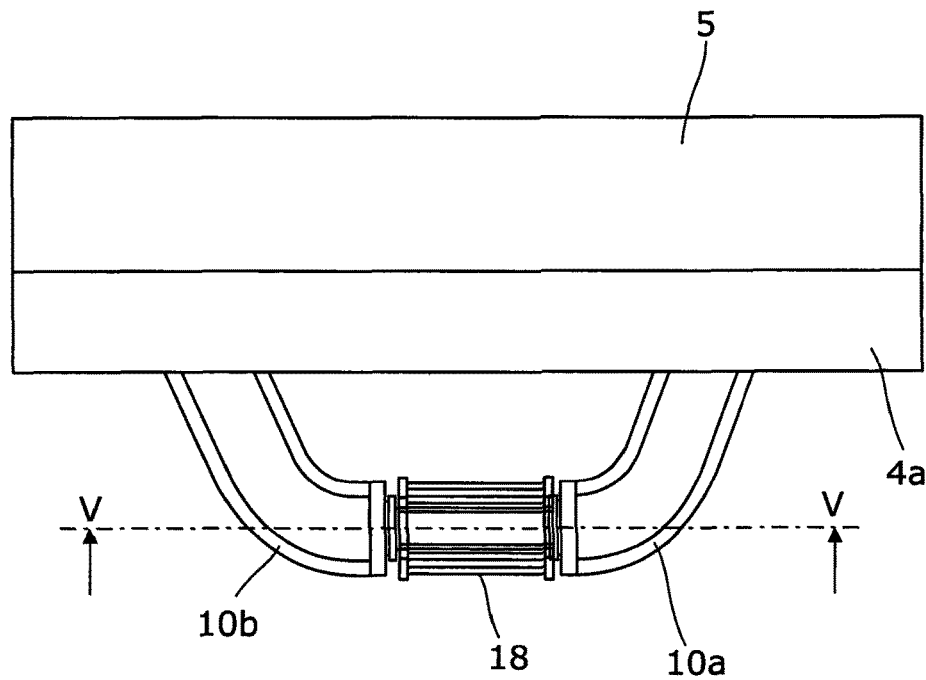
FIG. 4 is a plan view of the circulator device of FIG. 1.
Figure 5:
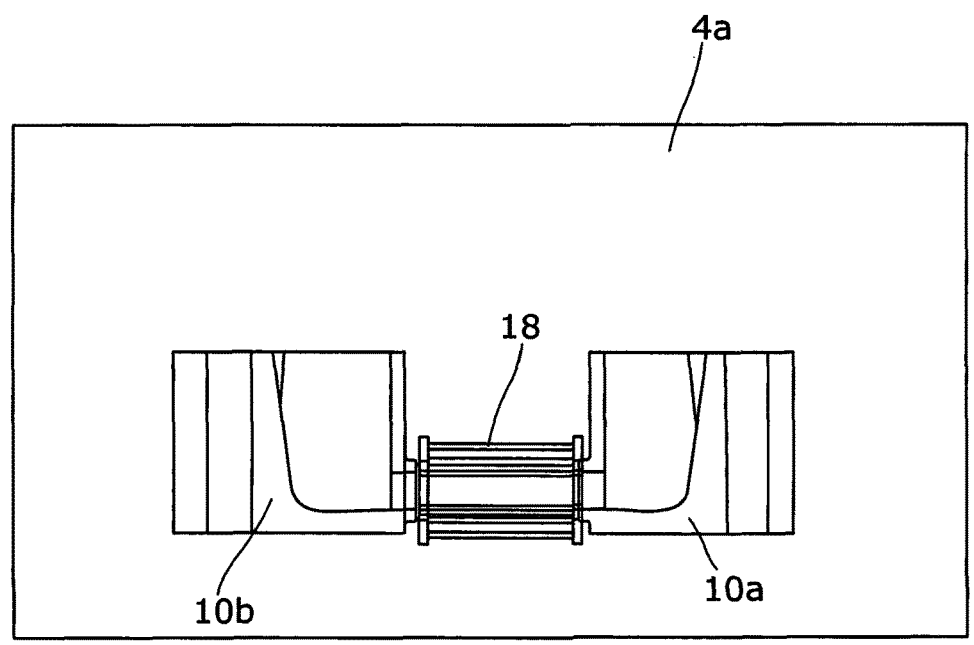
FIG. 5 is a cross-section on line V-V of FIG. 4.

The launder 10 may optionally include one or more flow control devices for controlling the flow of liquid metal between the furnace 2 and the launder 10. In the example shown in FIG. 2, these flow control devices comprise a pair of launder dams 24, which are mounted on the side wall 4a of the furnace as shown in FIG. 2 and can be raised and lowered like sluice gates. In FIG. 2 the launder dams 24 are shown in raised positions in which they are located above the inlet and outlet openings 14, 17 so that they do not obstruct the openings. The launder dams 24 are configured so that they can be dropped from the raised position to lowered positions in which they close off the inlet and outlet openings 14, 17 so as to prevent melt from flowing out of the furnace 2 into the launder 10. The optional launder dams 24 have been omitted from FIGS. 3-6.

The launder 10 is made of a refractory material and preferably includes one or more heating devices for preheating the launder to approximately the temperature of the liquid metal. The heating devices may include for example electrical heating elements, hot gas heating systems and combustion heating systems, for example including gas burners. The use of heating devices helps to protect the launder against damage by thermal shock when it is first contacted by the liquid metal, and it prevents freezing of the metal when it enters the launder. One possible construction of the launder is described in WO 2012/175911A, the content of which is incorporated by reference herein. The structure of this launder is described in more detail below.

In use, a body of liquid metal 6 in the furnace 2 is circulated by operating the pump 18 to drive a flow of melt through the launder 10, as indicated by the flow arrows A. Melt is therefore drawn from the furnace 2 through the first opening 14 and is reintroduced into the furnace 2 through the second opening 17. This flow of melt to and from the furnace causes the body of liquid metal 6 within the furnace 2 to circulate as indicated by flow arrows B.

The inlet and outlet ends 12, 16 and the first and second openings 14, 17 are configured to ensure a smooth, non-turbulent flow of melt to and from the furnace 2. Preferably, the inlet and outlet ends 12, 16 and the first and second openings 14, 17 are divergent as shown in FIG. 1, so that the flow of melt is directed at an acute angle towards the peripheral wall 4 of the furnace 2, to ensure circulation of the whole body of liquid metal within the furnace. The angles and shapes of the inlet and outlet ends 12, 16 and the first and second openings 14, 17 may be selected at the design stage to ensure smooth, non-turbulent flow of melt.

Figure 6:
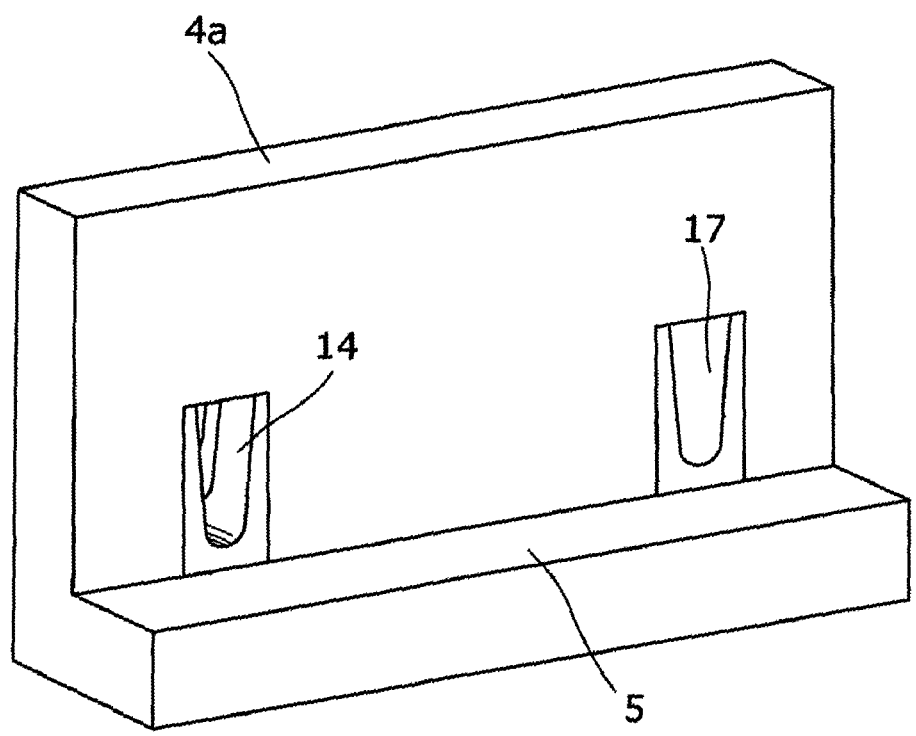
FIG. 6 is an isometric view showing the inner surface a furnace wall.

The first and second openings 14, 17 are preferably located close to the floor 5 of the furnace as shown in FIG. 6 so that melt can enter the launder 10 even when the level of liquid within the furnace is quite low. This ensures that circulation of the liquid metal can be provided during filling and emptying of the furnace. In the case of a melting furnace, where solid metal is heated to the melting temperature, the launder dams 24 if provided may initially be located in the closed positions to retain the metal within the furnace until a sufficient depth of liquid metal has been created. The dams 24 may then be opened to allow liquid metal to enter the launder 10. The dams 24 may also be partially lowered during use to a position where the lower edge of the dam is submerged below the free surface of the body of liquid metal, to hold back any dross floating on the surface of the liquid metal.

The pumping device may include a control device that controls the pumping rate of the pumping device. The control device may include a level measuring device 25 (FIG. 2) for measuring the level of liquid metal within the launder, and be configured to control the pumping rate of the pumping device according to a measured level of liquid metal within the launder. The mass flow of the liquid metal can thus be adjusted to increase thermal efficiency within the main body of the vessel. The level measuring device 25 may alternatively, or in addition, be used as a safety device to halt operation of the pumping device if, for example, the outlet end of the launder becomes blocked, causing the level of melt in the launder to rise.

Figure 7:
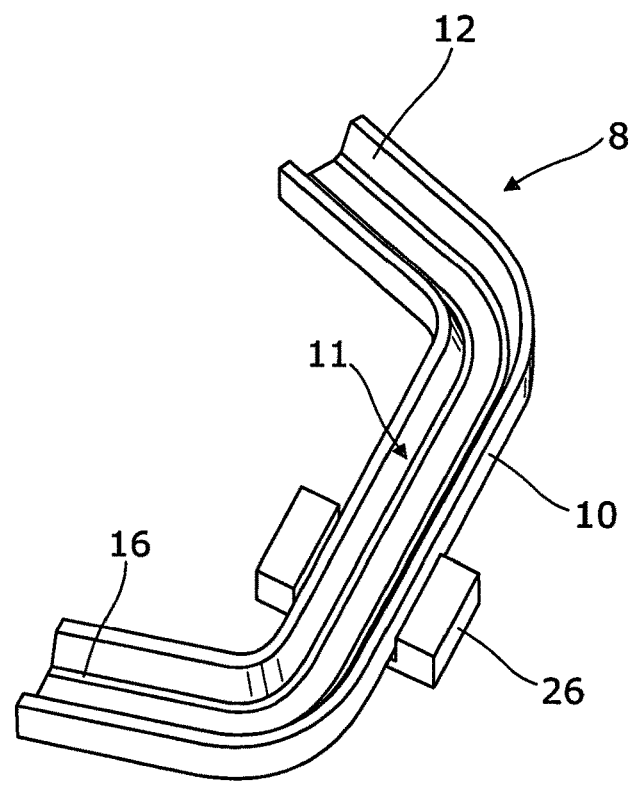
FIG. 7 is an isometric view from above of a circulator device according to a second embodiment.
Figure 8:
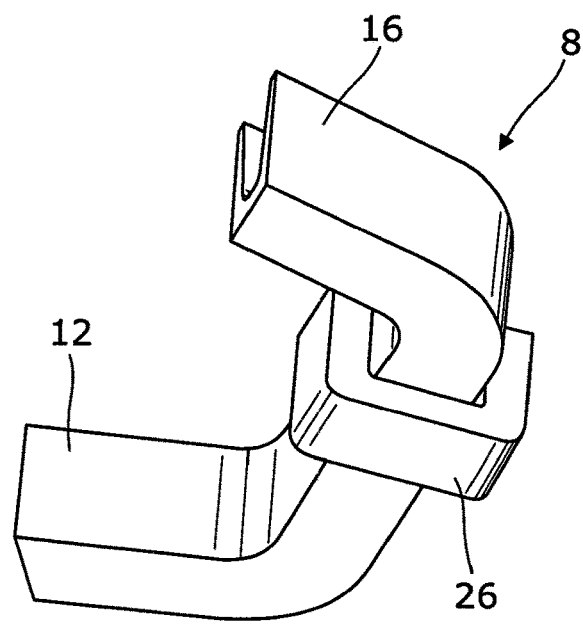
FIG. 8 is an isometric view of the second circulator device seen from below.

A circulator device 8 according to a second embodiment is shown in FIGS. 7 and 8. In this embodiment the launder 10 extends continuously from the inlet end 12 to the outlet end 16. An electromagnetic pump 26 is arranged around a central part of the launder 10, between the inlet and outlet ends 12, 16. As with the tube pump of the first embodiment, the electromagnetic pump 26 includes a plurality of axially separated coils, which are supplied with phase-shifted alternating currents to create a magnetic field that travels in the axial direction of the launder so as to pump melt along the launder. However, in this case, the coils are U-shaped and are wrapped around the sides and base of the launder 10. This arrangement has the advantage of providing a continuous open flow channel 11 that is accessible along the whole of its length, so that it can be easily cleaned and any deposits removed.

Figure 9:
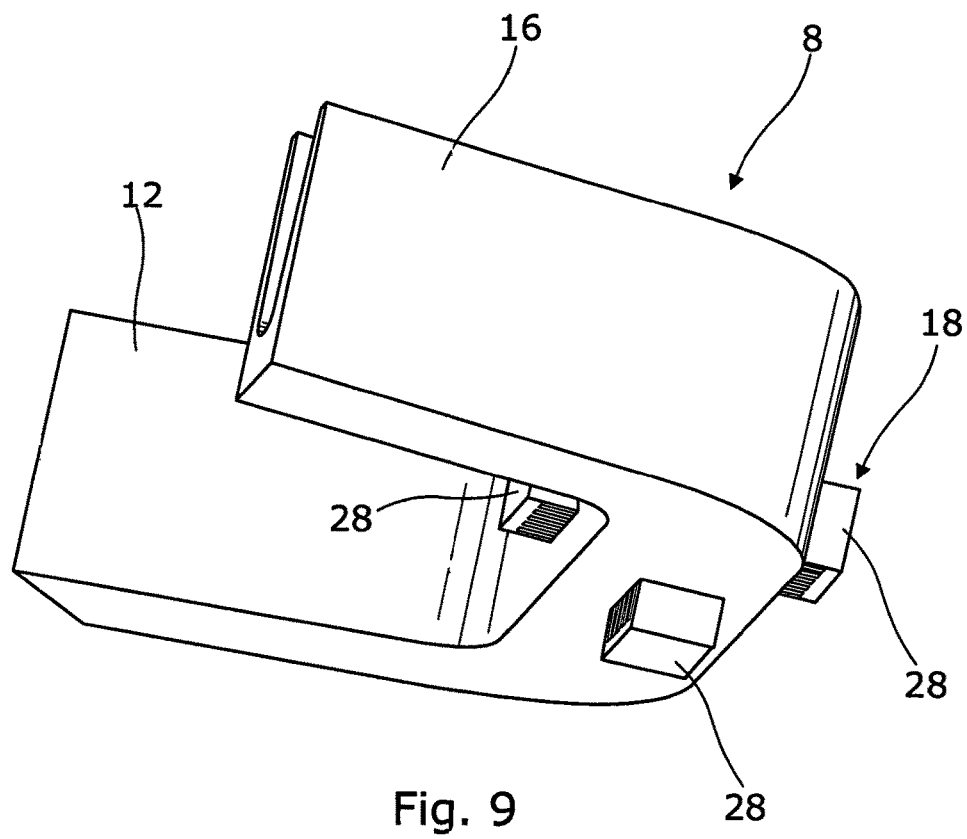
FIG. 9 is an isometric view from below of a third circulator device.
Figure 10:
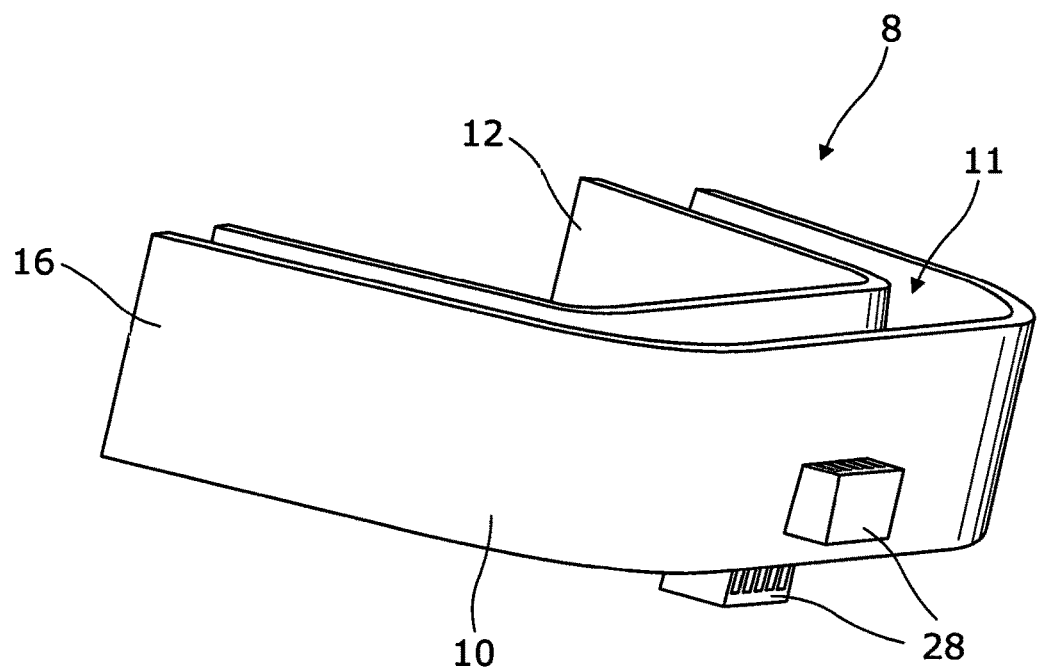
FIG. 10 is an isometric view from above of the third circulator device.
Figure 11:
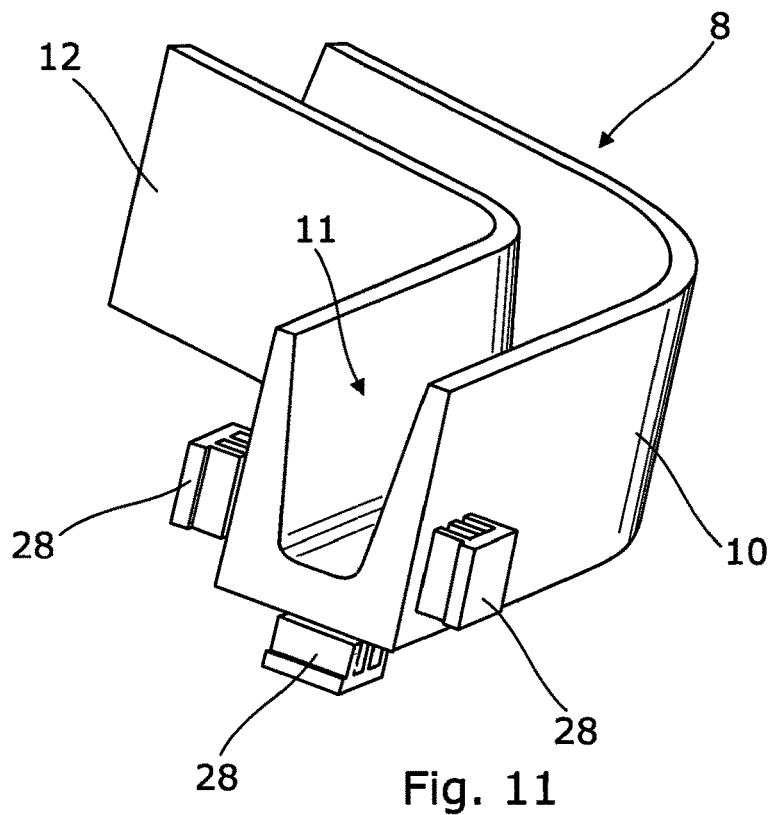
FIG. 11 is an isometric view showing the third circulator device partially in section.

A circulator device 8 according to a third embodiment of the invention is shown in FIGS. 9, 10 and 11. As with the second embodiment, the launder 10 extends continuously from the inlet end 12 to the outlet end 16, providing a continuously open flow channel 11. The electromagnetic pump 18 consists in this case of three separate induction devices 28, which are arranged on the sides and base of a central part of the launder 10 between the inlet and outlet ends 12, 16. Each induction device 28 comprises a set of coils, which are supplied with phase-shifted alternating currents to create a magnetic field that travels in the axial direction of the launder to pump melt along the launder. As with the second embodiment, this arrangement also has the advantage of providing a flow channel 11 that is accessible along the whole of its length, so that it can be easily cleaned and any deposits removed.

Figure 12:
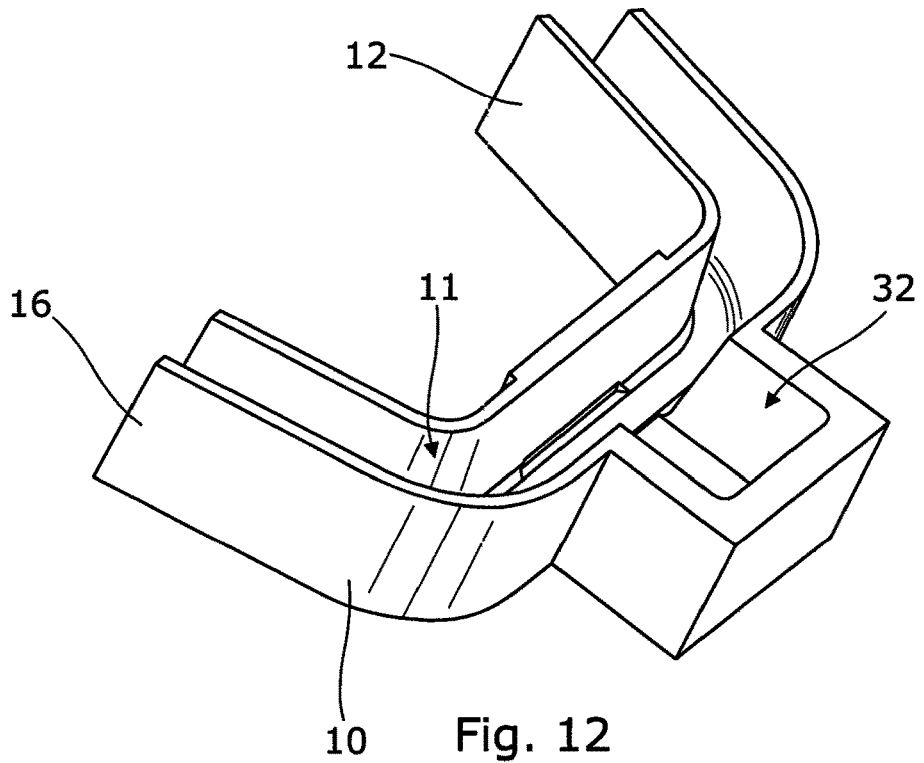
FIG. 12 is an isometric view from above of a fourth circulator device.
Figure 13:
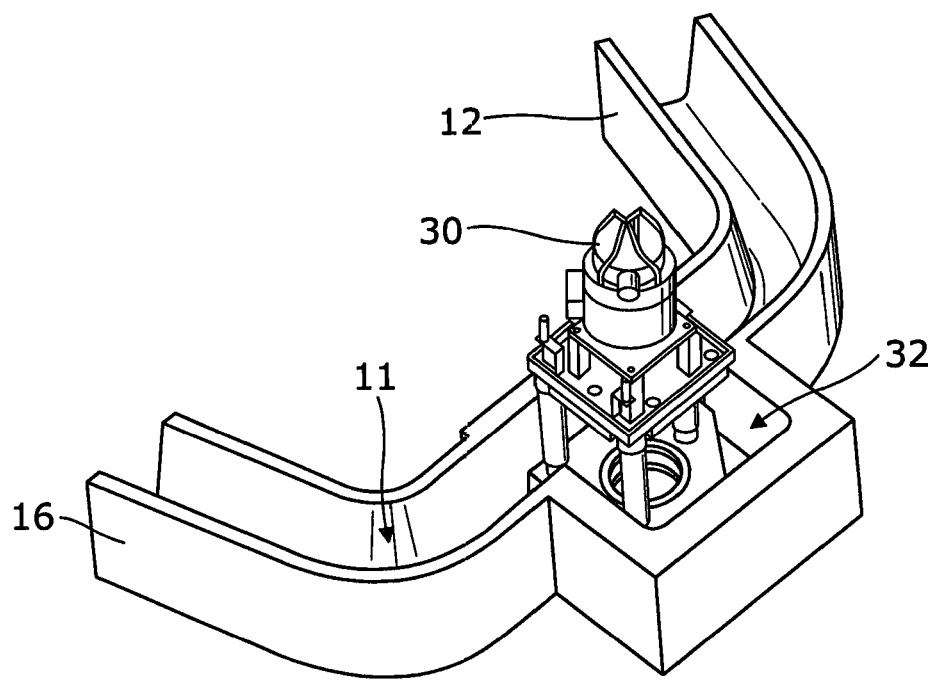
FIG. 13 is an isometric view of the fourth circulator device from above.
Figure 14:
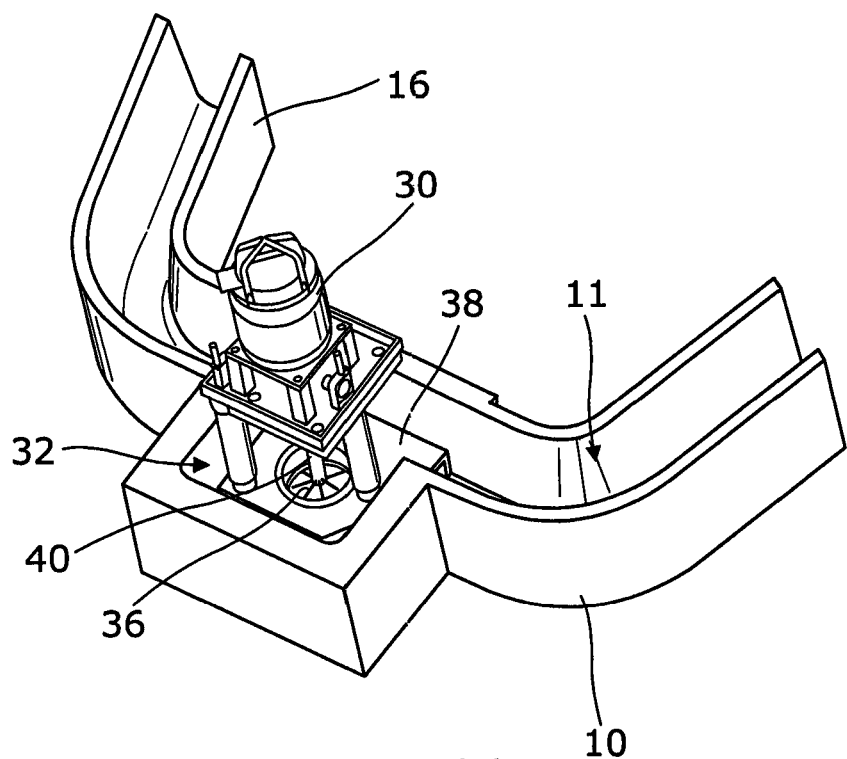
FIG. 14 is another isometric view of the fourth circulator device from above.

A circulator device 8 accordingly to a fourth embodiment is shown in FIGS. 12, 13 and 14. This embodiment also includes an open launder 10 that extends continuously from the inlet end 12 to the outlet end 16. Instead of an electromagnetic pump, in this embodiment the circulator device 8 includes a mechanical pump 30 for pumping melt through the launder. In this embodiment the pump 30 is located in a central part of the launder 10 between the inlet and outlet ends 12, 16, and is accommodated within an enlarged launder section 32. The pump may however be located elsewhere within the launder. The pump 30 includes a motor 34, for example an electric motor 34 or an air motor, which drives a set of paddles 36 within a housing 38 via a shaft 40. The paddles 36, the housing 38 and the shaft 40 are made of a material that is able to withstand contact with the liquid metal without excessive erosion. The paddles 36 are driven by the motor 30 to pump the melt mechanically through the launder 10.

Figure 15:
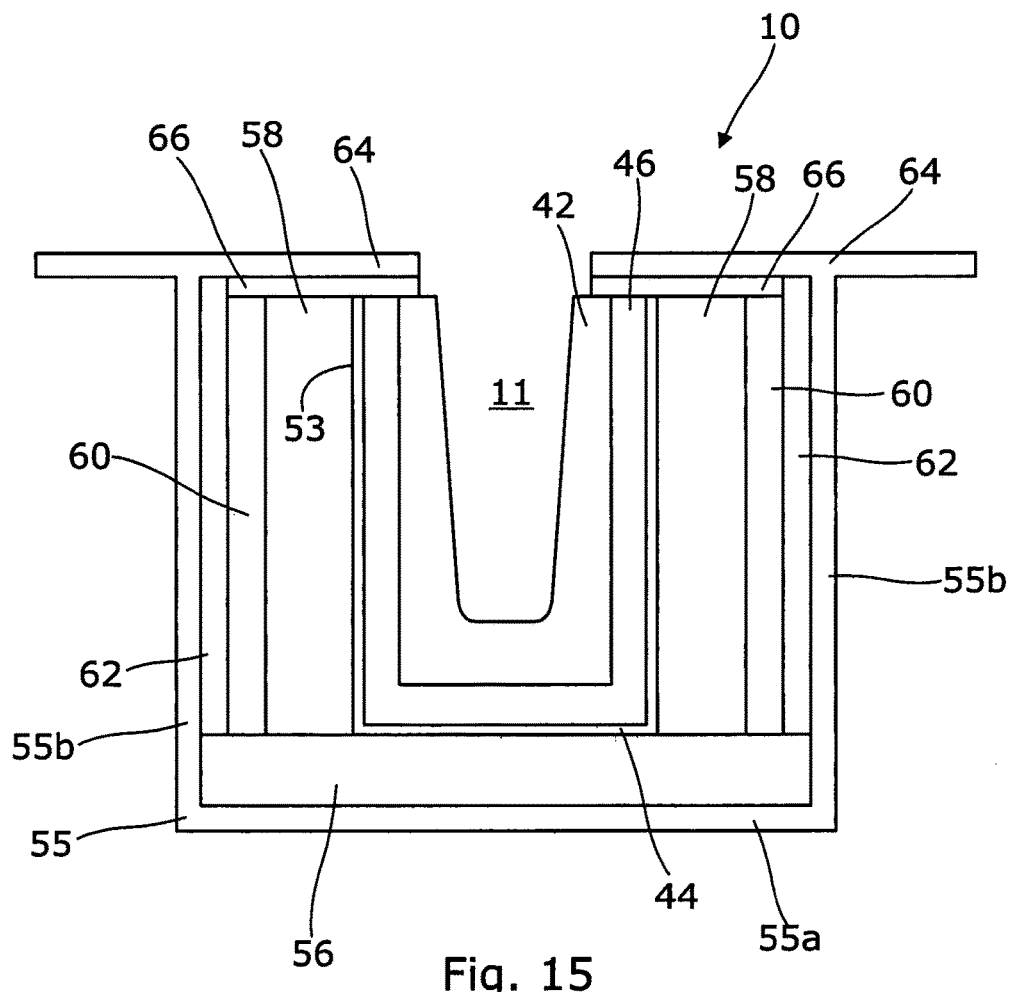
FIG. 15 is a sectional view of a heated launder forming a component of a circulator device.

FIG. 15 illustrates the one possible structure for the heated launder, which in this example is as described in WO 2012/175911A. The launder 10 consists of an open trough through which liquid metal can be poured, which has a substantially uniform transverse cross-section. The launder 10 includes a trough body 42 for receiving the liquid metal. The trough body 42 is substantially U-shaped in vertical cross-section and defines an open-topped flow channel 11 for containing the liquid metal as it flows through the device. The trough body 42 is preferably made of a cast refractory material. For example, the trough body may be made of fused silica ($SiO_2$) or alumina ($Al_2O_3$), according to the application for which the device is intended.

The trough body 42 is located centrally within a U-shaped metallic shell 44 that is made, for example, of stainless steel. The shell 44 is wider and deeper than the trough body 42, leaving a gap around the sides and base of the trough body. This gap is preferably ram-filled with a thermally conductive castable refractory material forming a filler layer 46. The filler layer 46 is preferably made of a castable refractory material having a high thermal conductivity: that is, a thermal conductivity of at least 3 W/m.K, preferably at least 5 W/m.K and more preferably at least 6.5 W/m.K.

Where electromagnetic forces are used to drive the melt through the launder the metallic shell 44 may if necessary be omitted or replaced with a shell made of a material such as austenitic stainless steel that does not influence the magnetic field in regions of the launder where it is necessary for the magnetic field to penetrate through the launder to influence the melt in the trough body 42. For example, in the second embodiment shown in FIGS. 7-8 the metallic shell may be omitted in the region adjacent the coils that form the electromagnetic pump 26, and in the third embodiment shown in FIGS. 9-11 the metallic shell may be omitted in the region adjacent the coils 28.

The filler material may for example be Pyrocast™ SCM-2600 sold by Pyrotek, Inc. This is a high purity silicon carbide-based castable refractory with low cement content. It has a thermal conductivity of 7.19 W/m.K at 816° C.

More generally, the filler material may be a silicon carbide-based castable refractory with a high percentage of silicon carbide, for example about 80% silicon carbide by weight. The refractory may also contain other materials such as metallic fines for increased thermal conductivity.

Other materials such as aluminium nitride can also be used, either as the main component of the filler material or included as an additional component within a silicon carbide-based refractory. Aluminium nitride has an extremely high thermal conductivity but is very expensive and so its use may be limited to only the most demanding applications.

Materials having slightly lower thermal conductivities, such as alumina and silicon nitride, may also be used in less demanding applications.

The trough body 42, the metallic shell 44 and the filler layer 46 together comprise a unitary structure that is separable from the other parts of the launder 10, which are described below. This unitary structure, which will be referred to herein as a trough cartridge 53, may be made and sold separately as a replaceable component of the launder 10.

The outer part of the launder 10 includes a metal outer casing 55, which is made for example of steel and comprises a base 55a and two side walls 55b forming a U-shaped channel. A base layer 56 of thermal insulating material, for example low density fibre board, fills the lower part of this channel and supports the trough cartridge 53.

Mounted within the casing 55 adjacent the sides of the trough cartridge 53 are a pair of optional heater panels 58, each comprising an electrical heating element embedded within a ceramic support matrix. These heater panels 58 can be moved horizontally within the casing 55 towards or away from the trough cartridge 53 and can be clamped in the chosen position. During operational use, the heater panels 58 are positioned against the metallic shell 44 of the trough cartridge 53, to ensure efficient transfer of heat from the heater panels through the shell 44 to the thermally conductive filler layer 46 into the trough body 42. The heater panels 48 can also be moved away from the trough cartridge 53 to allow removal and replacement of the trough cartridge 53.

Each heater panel 58 includes on its outer surface an insulating layer 60 of a suitable thermal insulating material, for example low density fibre board. An air gap 62 is provided between the insulating layer 60 and the adjacent side wall 55b of the casing to allow for sideways displacement of the heater panel 58, and further to reduce heat transfer to the casing 55.

The upper parts of the trough cartridge 53, the casing 55 and the heater panels 58 are covered by a pair of steel top plates 64, each top plate 64 being thermally insulated by an upper layer of insulating material 66, for example a ceramic fibre blanket or low density fibre board. The top plates 64 are either removable or are attached to the casing by hinges, so that they can be removed or repositioned to allow access to the interior of the launder 10, for example for removal and replacement of the trough cartridge 53 or adjustment or maintenance of the heating panels 58, or to allow cleaning of the channel 11.

Figure 21:
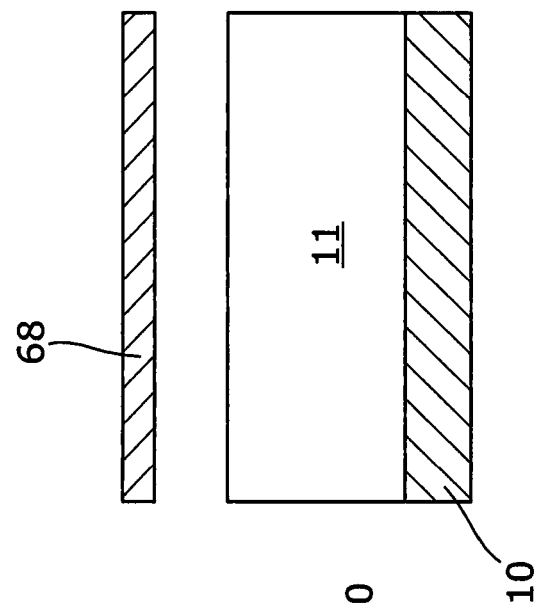
FIG. 21 is a side-sectional view of the eighth circulator device with the lid removed.
Figure 20:
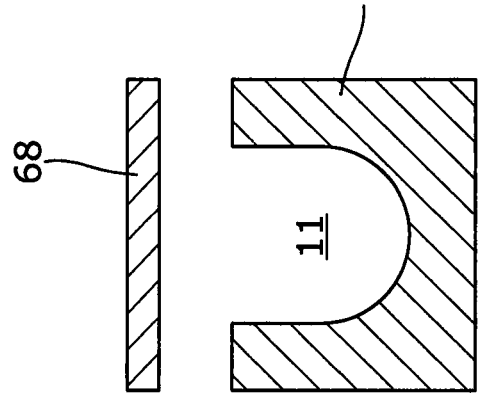
FIG. 20 is a cross-sectional view of the eighth circulator device with the lid removed.
Figure 19:
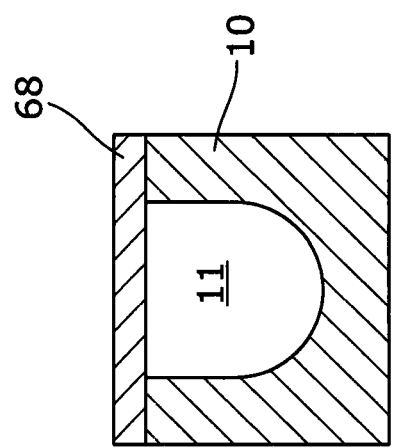
FIG. 19 is a cross-sectional view of part of an eighth circulator device.

Alternatively, as shown in FIGS. 19-21, the launder 10 may be provided with a lid 68 that is either removable or that can be opened to provide access to the flow channel 11. The lid 68 may for example be attached to the launder 10 with hinges or removable bolts. The lid 68 may optionally include a sealing element, for example a gasket (not shown), to provide a leak-proof seal over the flow channel 11. The lid 68 may be made of or may include a refractory material, allowing it to resist contact with the liquid metal. The launder 10 and/or the lid 68 may include a steel shell for strength, and/or may include thermal insulating materials to reduce the rate at which heat escapes from the launder 10.

Figure 16A:
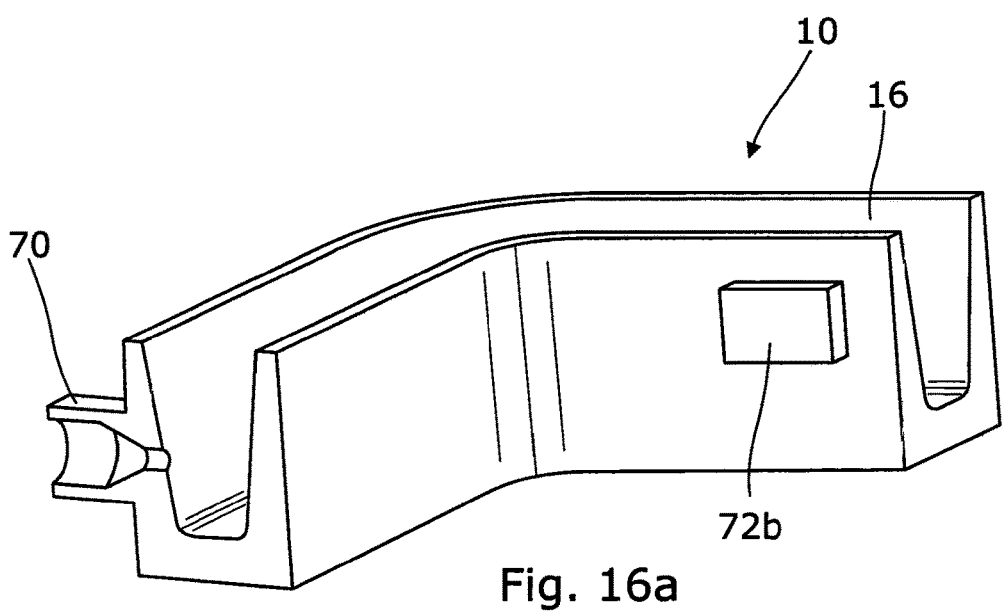
FIGS. 16a, 16b and 16c are alternative isometric views of a fifth circulator device, which includes a transfer port for transferring melt from a furnace.
Figure 16B:
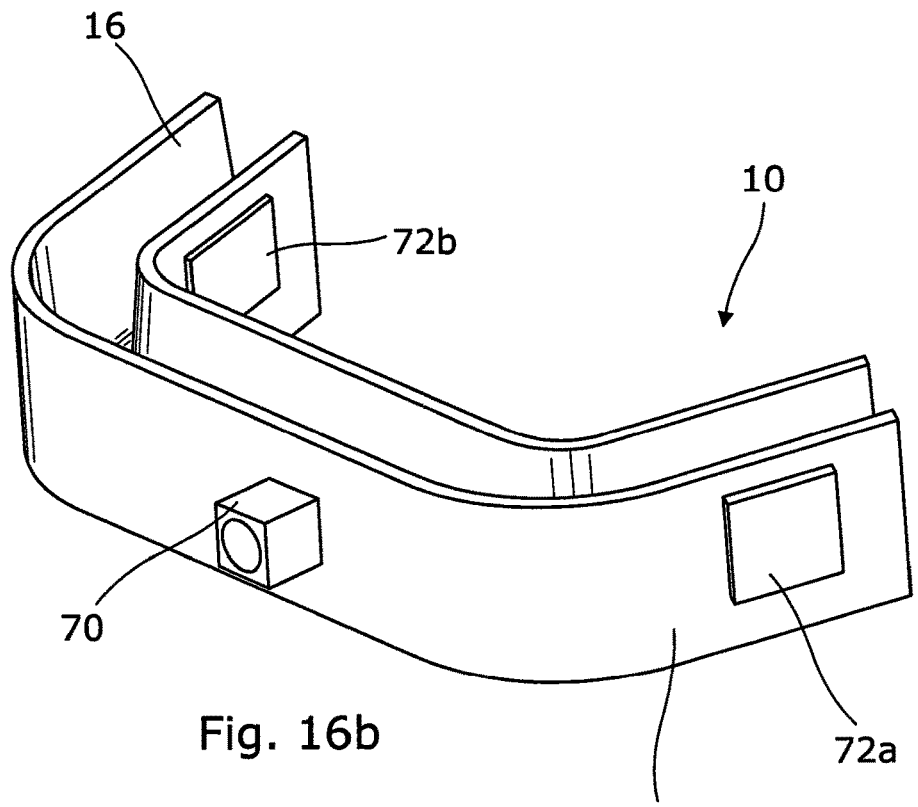
Figure 16C:
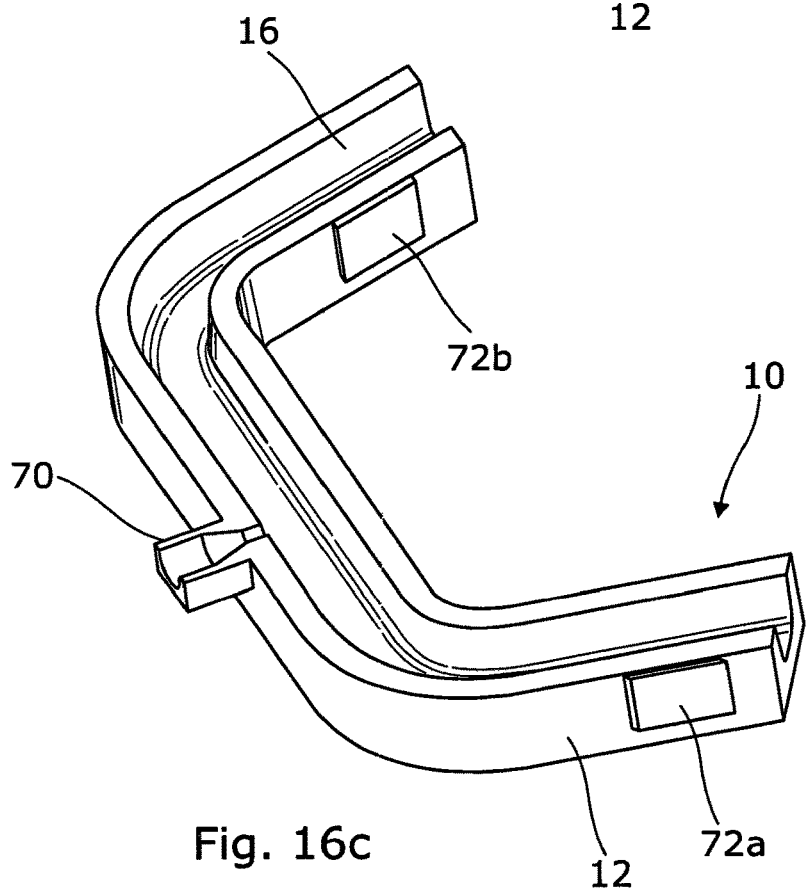

A modified form of the apparatus that allows metal to be transferred to and from the furnace 2 is shown in FIGS. 16a, 16b and 16c. In this modified apparatus, the launder 10 includes an additional outflow leg 70 through which metal can be transferred. In this example side plate inductors 72a, 72b are provided on both the inlet and outlet sections 12, 16 of the launder 10, although other pumping means may alternatively be provided. During circulating operation these inductors drive the metal through the launder 10 from the inlet section 12 to the outlet section 16 and from there back into the furnace. Alternatively, the inductor 72b on the outlet section 16 can be operated in reverse to drive liquid metal out of the furnace. Liquid metal will therefore flow outwards through both sections 12, 16 of the launder 10 and along the additional outflow leg 70 to a downstream location. A plug (not shown) may be provided to close the outflow leg 70, to prevent liquid metal from flowing through the outflow leg.

Figure 17:
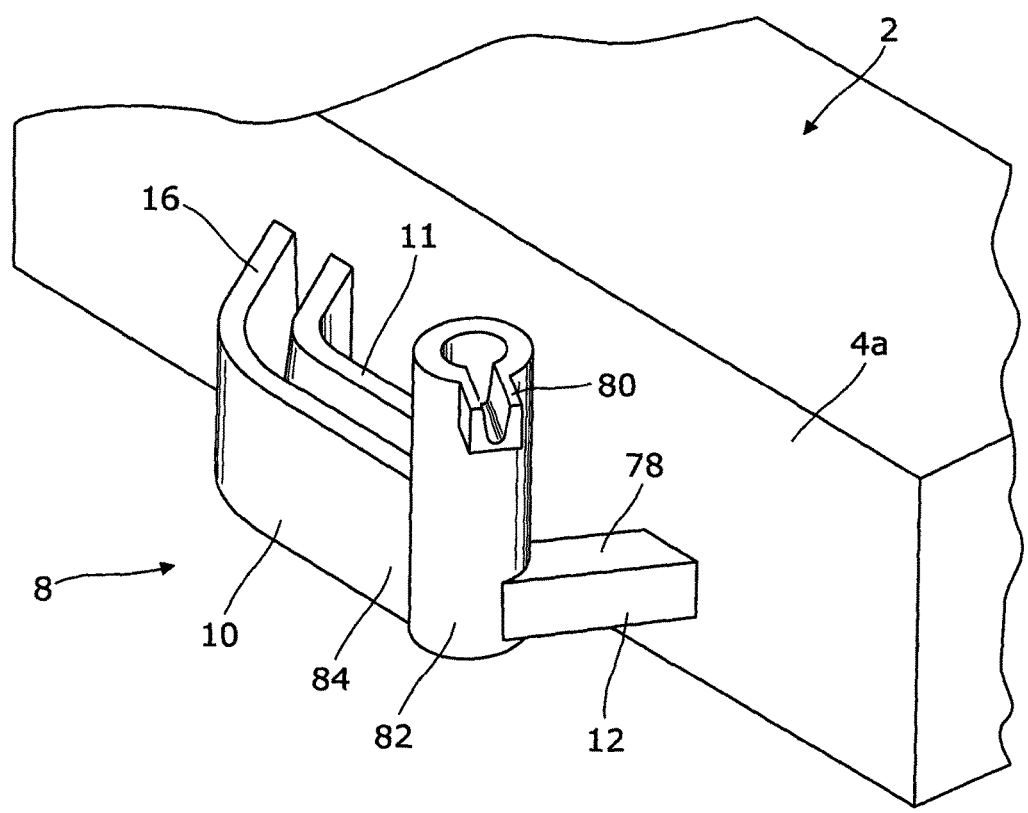
FIG. 17 is an isometric view from below of part of a sixth circulator device.

Another modified form of the apparatus that, in additional to circulating metal within a furnace 2, also allows metal to be lifted to a higher level is shown in FIG. 17. The furnace 2 includes a circulator device 8 for circulating the body of liquid metal 6 in the furnace 2. The circulator device 8 comprises a flow channel 11, which is substantially U-shaped in horizontal section and is externally mounted on a side wall 4a of the furnace 2. The flow channel 11 comprises an upstream inlet end 12 that is connected to an inlet opening in the side wall 4a and a downstream outlet end 16 that is connected to an outlet opening in the side wall 4a, allowing liquid metal to flow to and from the furnace 2 through the flow channel. The upstream part of the flow channel 11 adjacent the inlet end 12 is enclosed and includes an electromagnetic tube pump 78 for pumping melt through the flow channel. The downstream part of the flow channel 11 adjacent the outlet end 16 comprises an open-topped trough or launder 10.

In this embodiment, the launder 10 also includes a secondary outlet 80 for dispensing liquid metal at a higher level. The secondary outlet 80 is located at the upper end of a vertical vessel 82, for example a tube, which is positioned within the flow channel 11 between the inlet end 12 and the outlet end 16. A controllable plug or damper 84 is provided on the downstream side of the vessel 82 between the vessel and the launder 10. This plug 84 can be opened to allow metal to flow from the vessel 82 into the launder 10 or closed to prevent metal from flowing into the launder 10. When the plug 84 is closed the liquid metal is lifted vertically up the vessel 82 towards the secondary outlet 80 so that it can be dispensed at a higher level. Alternatively, by opening the plug 84 metal can be circulated through the launder 10 as described previously.

Figure 18:
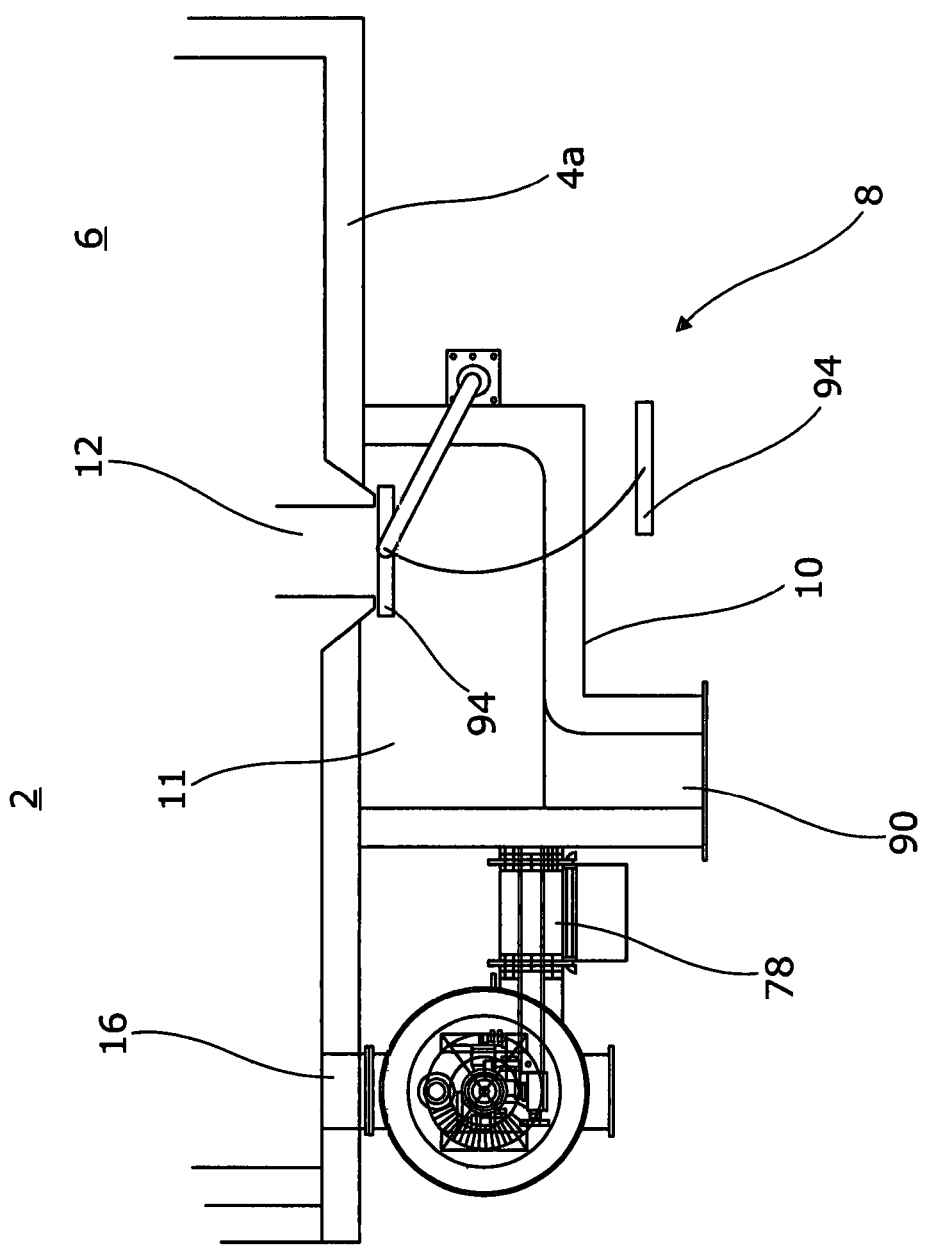
FIG. 18 is a plan view from above of part of a seventh circulator device.

Another modified form of the apparatus that allows metal to be lifted to a higher level is shown in FIG. 18. The furnace 2 includes a circulator structure 8 for circulating the body of liquid metal 6 in the furnace 2. The circulator structure 8 comprises a flow channel 11, which is substantially U-shaped in horizontal section (typically a vertical walled vessel with a flat base) and is externally mounted on a side wall 4a of the furnace 2. The flow channel 11 comprises an upstream inlet end 12 that is connected to an inlet opening in the side wall 4a and a downstream outlet end 16 that is connected to an outlet opening in the side wall 4a, allowing liquid metal to flow to and from the furnace 2 through the flow channel. The upstream part of the flow channel 11 adjacent the inlet end 12 comprises an open-topped trough or launder 10. The downstream part 16 comprises a closed passageway that includes an electromagnetic tube pump 78 for pumping melt through the flow channel.

In this embodiment, the launder 10 includes a secondary outlet 90 for dispensing liquid metal at a higher level. The secondary outlet 90 is located at higher level than the base of the launder so that during normal pumping operation the level of melt within the flow channel 11 is below the level of the secondary outlet 90. A controllable stopper 94 is provided at the upstream end of the flow channel 11, which can be closed to prevent melt from flowing through the inlet end 12 between the furnace 2 and the launder 10. This stopper 94 can be opened to allow metal to flow from the furnace 2 into the launder 10 or closed to prevent metal from flowing into or from the launder 10.

During normal pumping operations the stopper 94 is open to allow melt to flow into the launder 10 through the inlet end 12. In order to dispense melt from the furnace 2 the stopper 94 is closed and the pump 78 is driven in reverse, causing melt to flow from the furnace 2 into the launder 10. The depth of metal in the launder therefore increases until it reaches the height of the secondary outlet 90, whereupon it flows out of the launder 10 so that it can be dispensed at a higher level. Alternatively, by opening the stopper 94 and driving the pump in the forward direction, metal can be circulated through the launder 10 into the furnace 2 as described previously.

Various other modifications of the systems described above are also possible. For example, a customer may have two furnaces that both require circulation (either independently or at the same time). The circulation system on each furnace may be operated independently with its own power supply, however the circulation systems would share a common control system that controls the power supplies. They may also share a common water cooling system.

The system may also incorporate a vessel for external charging of "materials" (scrap or alloys) into the furnace.

It is also possible to combine the launder system with a series of dams or plugs, and to use one pump to circulate liquid metal at any given time in any one of two or more furnaces. Typically, the system will be arranged to cause circulation of metal in whichever furnace is in a melting phase. The configuration of launders may also be designed to allow for the transfer of liquid metal between furnaces.

According to another aspect, the launder may be replaced by a closed passageway, for example a tubular passageway. The disclosure then comprises a metallurgical apparatus comprising a vessel for holding a body of liquid metal and a circulating apparatus for circulating the body of liquid metal within the vessel, wherein the vessel has a peripheral wall and a base, and the circulating apparatus comprises a passageway that provides a flow channel. A pumping device is provided for pumping liquid metal through the passageway. The passageway has an inlet end connected to a first opening in the peripheral wall and an outlet end connected to a second opening in the peripheral wall. The pumping device is configured to pump liquid metal through the passageway so that liquid metal flows out of the vessel through the first opening and into the vessel through the second opening, thereby causing the body of liquid metal within the vessel to circulate. The passageway includes a heating system for heating the passageway to a desired operating temperature.

The invention claimed is:

1. A metallurgical apparatus comprising:
   a vessel for holding a body of liquid metal, and
   a circulating apparatus for circulating the body of liquid metal within the vessel,
   wherein the vessel has a peripheral wall and a base, and
   wherein the circulating apparatus comprises:
   a launder that provides a flow channel, and
   a pumping device for pumping liquid metal through the launder,
   wherein the launder has an inlet end connected to a first opening in the peripheral wall and an outlet end connected to a second opening in the peripheral wall, each of the inlet end and outlet end being selectively opened and closed by moveable dams adjustable between an open configuration in which the flow of liquid metal between the vessel and the launder is permitted, and a closed configuration in which the flow of liquid metal between the vessel and the launder is prevented, and
   wherein the pumping device is configured to pump liquid metal through the launder so that liquid metal flows out of the vessel through the first opening and into the vessel through the second opening, thereby causing the body of liquid metal within the vessel to circulate.

2. The metallurgical apparatus according to claim 1, wherein the flow channel is open-topped and includes a lid that closes the flow channel and can be opened or removed to provide access to the flow channel.

3. The metallurgical apparatus according to claim 1, wherein the launder includes a heating system for heating the launder to a desired operating temperature.

4. The metallurgical apparatus according to claim 3, wherein the heating system includes at least one electrical heating element configured to heat the launder.

5. The metallurgical apparatus according to claim 4, wherein the launder includes a ceramic trough body that provides the flow channel, and wherein the heating system includes at least one electrical heating element positioned adjacent a side of the ceramic trough body.

6. The metallurgical apparatus according to claim 5, wherein the launder includes a filler layer of a thermally conductive refractory material between the ceramic trough body and the electrical heating element.

7. The metallurgical apparatus according to claim 1, wherein the pumping device includes an electromagnetic pump that generates a moving magnetic field within the flow channel to pump liquid metal along the flow channel.

8. The metallurgical apparatus according to claim 7, wherein the electromagnetic pump comprises a tube pump having a refractory tube and a set of electrical coils arranged around the tube.

9. The metallurgical apparatus according to claim 7, wherein the electromagnetic pump comprises at least one set of induction elements arranged around a base and one or more sides of the flow channel.

10. The metallurgical apparatus according to claim 9, wherein the electromagnetic pump comprises a set of U-shaped electrical coils.

11. The metallurgical apparatus according to claim 1, wherein the pumping device includes a control device that is configured to control a pumping rate of the pumping device.

12. The metallurgical apparatus according to claim 11, wherein the control device includes a level measuring device for measuring a level of liquid metal within the launder, and is configured to control the pumping rate of the pumping device according to a measured level of liquid metal within the launder.

13. A metallurgical apparatus comprising:
a vessel for holding a body of liquid metal, and
a circulating apparatus for circulating the body of liquid metal within the vessel,
wherein the vessel has a peripheral wall and a base, and wherein the circulating apparatus comprises:
a launder that provides a flow channel, and
a pumping device for pumping liquid metal through the launder,
wherein the launder has an inlet end connected to a first opening in the peripheral wall and an outlet end connected to a second opening in the peripheral wall, each of the inlet end and outlet end being selectively opened and closed by moveable dams, adjustable between an open configuration in which the flow of liquid metal between the vessel and the launder is permitted, and a closed configuration in which the flow of liquid metal between the vessel and the launder is prevented, and
wherein the pumping device is configured to pump liquid metal through the launder so that liquid metal flows out of the vessel through the first opening and into the vessel through the second opening, thereby causing the body of liquid metal within the vessel to circulate and further including means for dispensing metal at a higher level, said means comprising a second vessel positioned in the launder and rising above said launder walls, wherein closing of one said dams allows molten metal to rise in the vessel for discharge above the launder walls.

14. The metallurgical apparatus according to claim 1, wherein the launder includes an additional flow leg for guiding a flow of liquid metal to or from a furnace.

* * * * *